(12) United States Patent
Fushimi et al.

(10) Patent No.: US 7,851,035 B2
(45) Date of Patent: Dec. 14, 2010

(54) MULTICOLOR GLASS VESSEL

(75) Inventors: Kunihiro Fushimi, Ichikawa (JP); Eiji Ue, Kasukabe (JP)

(73) Assignee: Koa Glass Co., Ltd., Tokyo (JP)

( * ) Notice: Subject to any disclaimer, the term of this patent is extended or adjusted under 35 U.S.C. 154(b) by 689 days.

(21) Appl. No.: 10/586,163

(22) PCT Filed: Mar. 11, 2005

(86) PCT No.: PCT/JP2005/004291
§ 371 (c)(1),
(2), (4) Date: Jul. 14, 2006

(87) PCT Pub. No.: WO2005/102954
PCT Pub. Date: Nov. 3, 2005

(65) Prior Publication Data
US 2008/0233319 A1    Sep. 25, 2008

(30) Foreign Application Priority Data
Apr. 26, 2004    (JP)    ............... 2004-129156

(51) Int. Cl.
*B32B 1/08*    (2006.01)
*A47G 35/00*    (2006.01)
(52) U.S. Cl. ................. 428/34.7; 428/542.2
(58) Field of Classification Search ............. 428/34.4, 428/34.7, 542.2
See application file for complete search history.

(56) References Cited

U.S. PATENT DOCUMENTS

| | | | | |
|---|---|---|---|---|
| 5,694,240 | A * | 12/1997 | Sternbergh | 359/359 |
| 6,228,480 | B1 * | 5/2001 | Kimura et al. | 428/429 |
| 6,359,380 | B1 * | 3/2002 | Nishizawa et al. | 313/479 |
| 6,534,903 | B1 * | 3/2003 | Spiro et al. | 313/113 |
| 2003/0156080 | A1 * | 8/2003 | Koike et al. | 345/60 |

FOREIGN PATENT DOCUMENTS

| | | |
|---|---|---|
| DE | 35 38 996 A1 | 5/1987 |
| EP | 0 031 278 | 7/1981 |
| EP | 0 759 566 A1 | 2/1997 |
| JP | S56-009368 | 1/1981 |
| JP | S59-184744 | 10/1984 |

(Continued)

*Primary Examiner*—Rena L Dye
*Assistant Examiner*—James Yager
(74) *Attorney, Agent, or Firm*—Manabu Kanesaka

(57) ABSTRACT

A multicolor development glass vessel of high surface hardness whose color is differentiated depending on the direction of viewing the glass vessel and a process for producing the same are provided. In the multicolor development glass vessel, a multilayer film is directly or indirectly formed on the external surface and internal surface, or either one thereof of the glass vessel by vapor deposition or sputtering technique and contains, for example, two types of vapor deposition layers whose refractive indices differ from each other by 0.1 or more in an alternate manner. Furthermore, for carrying out the process for producing the multicolor development glass vessel, the following steps (1) and (2) are included.

(1) Step of preparing a glass vessel.

(2) Step of forming a multilayer film composed of two types of vapor deposition layers having different refractive indices directly or indirectly provided on the external-surface and internal surface, or either one thereof of the glass vessel by a vapor deposition or sputtering technique.

7 Claims, 7 Drawing Sheets

FOREIGN PATENT DOCUMENTS

| | | |
|---|---|---|
| JP | H10-203848 | 8/1998 |
| JP | H11-80662 | 3/1999 |
| JP | H11/181334 | 7/1999 |
| JP | 2000-185945 | 7/2000 |
| JP | 2001-180983 | 7/2001 |
| WO | WO97/00134 | 1/1997 |
| WO | WO 02/18132 A2 | 3/2002 |

* cited by examiner (a)

(b)

(a)

(b)

(a)

(b)

MULTICOLOR GLASS VESSEL

TECHNICAL FIELD

The present invention relates to a multicolor glass vessel, and more specifically to a multicolor glass vessel of high surface hardness whose color is differentiated depending on the direction of viewing the glass vessel.

BACKGROUND ART

Conventionally, a melamine resin has been greatly used for a thermosetting coating composition for glass because of an excellent strength of its hardened coating film and an excellent adhesion thereof with the surface of glass. In addition, after coating the surface of glass, a hardened coating film is formed by heat hardening, so that the decorativeness and aesthetic appearance of the glass, as well as the protective properties of the glass, could be improved.

However, any hardened coating film made of such a thermosetting coating composition has a problem in that it can be easily peeled when curved and protruded portions are found on the surface of glass. In addition, when multiple coloring agents are added into these hardening coating compositions, these agents may be non-uniformly dispersed, so that the decorativeness and aesthetic appearance of a glass vessel may be deteriorated while the strength of a hardened coating may be remarkably deteriorated.

Consequently, there is disclosed a coating composition prepared such that a component (A), such as a film-formable resin composed of a polyol resin (a1) and a hardening resin (a2) that reacts with an isocyanate compound, are added with a component (B), such as a partially hydrolyzed condensate of an alkoxysilane compound, and at least one compound (C), such as 0.1 to 40 μm in size of an inorganic filler and 0.1 to 30 μm in size of an organic polymer particle (c2) (see Patent Document 1).

Furthermore, there is disclosed a coating composition as a thermosetting coating composition for glass, which contains an epoxy resin as a main component being reacted with a polyol compound (see Patent Document 2).

However, a hardened coating film made of any of coating compositions has a poor strength, and besides a glass vessel is basically recognized only as a single color without depending on the direction of viewing the glass vessel. There is a problem in that the decorativeness and aesthetic appearance are still insufficient.

On the other hand, there is a known technology in which multiple vapor deposition layers having different refractive indices are alternatively piled up one after the other on the surface of a flat glass substrate to form a multilayer film as an antireflection film. However, in the case of the antireflection film, it intends to enhance its transmittivity while preferably preventing the generation of interference light. However, there is no exemplified configuration in which such interference light is actively used to view different colors of the glass vessel depending on the direction of viewing a stereoscopic glass vessel.

[Patent Document 1] JP 11-181334 A (Claims)
[Patent Document 2] JP 11-80662 A (Claims)

DISCLOSURE OF THE INVENTION

Consequently, the present inventors have completed the present invention by intensively studying the above problem and finding out that the formation of a multilayer film comprised of multiple vapor deposition layers having different refractive indices on the surface of a glass vessel allows active use of interference light to get views of different colors of the glass vessel depending on the angle of viewing and to extensively improve the surface hardness.

In other words, an object of the present invention is to provide a multicolor development glass vessel of high surface hardness whose color is differentiated depending on the direction of viewing the glass vessel and a process for effectively producing such a multicolor development glass vessel.

According to the present invention, a multicolor development glass directly or indirectly having a multilayer film composed of multiple vapor deposition layers whose refractive indices differ from each other on an external surface and internal surface, or either one thereof, of the glass vessel, thereby solving the aforementioned problem.

Thus, by providing a multilayer film composed of multiple vapor deposition layers having different refractive indices, interference rays having different wavelengths tend to occur depending on the direction of viewing a glass vessel, thereby allowing the color of the glass vessel to be recognized as complicated colors such as rainbow colors, iridescent colors, and scale patterns. In particular, the color of the glass vessel could be recognized as extremely complicated colors when a colored content is included in the inside of the glass vessel.

In addition, the multilayer film composed of multiple vapor deposition layers utilizes a plurality of inorganic materials or the like as raw materials, so that it could be provided with extremely high surface hardness, different from a resin-coating film.

Furthermore, the multilayer film composed of multiple vapor deposition layers are not always provided on the whole surface of the glass vessel. Preferably, the multilayer film may be patterned to represent predetermined drawings, characters, and symbols. Alternatively, the multilayer film may be preferably formed only within the range of allowing viewing when the glass vessel is viewed.

Furthermore, for constructing the multicolor development glass vessel of the present invention, the multilayer film preferably contains two types of vapor deposition layers whose refractive indices differ from each other by 0.1 or more alternately piled one upon other.

Such a configuration allows interference light rays having different wavelengths tends to occur much more depending on the direction of viewing the glass vessels, thereby viewing various colors on the glass vessel.

Furthermore, by configuring in such a way, variations in numbers of vapor deposition materials and vapor conditions could be prevented or lowered, thereby easily carrying out the formation of a multiple layer in a stable manner.

In addition, for constructing the multicolor development glass vessel of the present invention, the lower layer of a multilayer film preferably contains at least one of a silica layer, a chromium layer, a zirconium layer, and an aluminum layer. By configuring such a way, adhesion between the glass vessel and the multilayer film could be improved, thereby easily preventing peeling between the glass vessel and the multilayer film.

Here, the silica layer provided as a lower layer may be any of those that make silicon oxide ($SiO_2$) a main component. The chromium layer may be any of those that make chromium metal (Cr) or chromium oxide ($CrO_2$) a main component. Similarly, the zirconium layer may be any of those that make zirconium metal (Zr) or zirconium oxide ($ZrO_2$) a main component. The aluminum layer may be any of those that make aluminum metal (Al) or aluminum oxide ($Al_2O_3$).

Furthermore, for constructing the multicolor development glass vessel of the present invention, two types of vapor deposition layers preferably contains two or more layers in which silica and titanium layers are alternately piled one upon the other.

In this way, multicolor properties could be significantly exerted by comprising at least two or more layers, silica layer having a comparatively small refractive index (refractive index: 1.46) and titanium layer having a comparatively larger refractive index (refractive index: 2.35).

In addition, by configuring in such a way, the adhesion to a glass vessel and the surface hardness could be enhanced and variations in vapor-deposition conditions could be lowered, thereby carrying out the formation of a multilayer film easily and stably.

Furthermore, the silica layer may be any of those that contain silicon oxide ($SiO_2$) as a main component. The titanium layer may be any of those that contain titanium metal (Ti), titanium monoxide (TiO), and titanium dioxide ($TiO_2$) as a main component.

Furthermore, for constructing the multicolor development glass vessel of the present invention, it is preferable that each of multiple vapor deposition layers has a thickness within the range of 50 to 3,000 nm.

By configuring in such a way, any distortion generated in the insides of multiple vapor deposition layers could be made small while variations in vapor deposition conditions could be reduced. Therefore, the formation of a multilayer film could be carried out easily and stably.

Furthermore, for constructing the multicolor development glass vessel of the present invention, a polysiloxane-based coating film is preferably provided between the external or internal surface of the glass vessel and multiple vapor deposition layers.

By configuring in such a way, peeling between the glass vessel and the multilayer film could be more effectively prevented.

In addition, various kinds of coloring agents could be added to the inside of the polysiloxane-based coating film, so that various complicated colors could be recognized by the direction of viewing the glass vessel.

Furthermore, for example effectively preventing the peeling between multilayer films, the polysiloxane-based coating film preferably has a hardness of 3H or more.

Furthermore, another aspect of the present invention is a process of producing a multicolor development glass vessel directly or indirectly having a multilayer film on the surface of the glass vessel, comprising the following steps (1) and (2):

(1) preparing the glass vessel, and (2) forming the multilayer film composed of multiple vapor deposition layers having different refractive indices on the external and internal surfaces of the glass vessel or either one thereof by a vapor deposition or sputtering technique.

In other words, a multilayer film is composed of multiple vapor deposition layers having different refractive indices as described above, so that interference rays having different wavelengths tend to occur. Therefore, a glass vessel by which different colors could be recognized by the direction of viewing the glass vessel could be effectively obtained.

In addition, the multilayer film composed of multiple vapor deposition layers having different refractive indices utilizes plural inorganic materials or the like having different reflective indices in contrast to a resin coating film. Therefore, a glass vessel having significantly high surface hardness could be effectively obtained.

Furthermore, for carrying out the process of producing the multicolor development glass vessel of the present invention, in the step (2), preferably, two types of vapor deposition layers whose reflective indices differ from each other by 0.1 or more are alternately formed.

By carrying out in this way, a glass vessel capable of recognizing various colors on the glass vessel by the direction of viewing the glass vessel could be efficiently produced.

Furthermore, for carrying out the process of producing the multicolor development glass vessel of the present invention, as a lower layer of the multilayer film, it is preferable to form at least one additional layer such as silica layer, a chromium layer, a zirconium layer, or an aluminum layer.

Furthermore, for carrying out the process of producing the multicolor development glass vessel, during the steps (1) and (2), it is preferable to include the step of forming a polysiloxane-based coating film as a step (1').

By carrying out in this way, a glass vessel, which is capable of effectively preventing the peeling between the glass vessel and multilayer film, could be efficiently produced.

Furthermore, various kinds of coloring agents could be added to the inside of a polysiloxane-based coating film, so that a glass vessel capable of recognizing further complicated colors could be efficiently produced.

Furthermore, for carrying out the process of producing a multicolor development glass vessel of the present invention, in the step (2), it is preferable to form a multilayer film while revolving a glass vessel.

By carrying out in this way, a multilayer film could be formed uniformly and stably.

According the multicolor development glass vessel of the present invention, by forming the multilayer film composed of multiple vapor deposition layer (containing a spattering film, and so forth), multiple interference rays having different wavelengths tend to occur, depending on the direction of viewing the glass vessel, the color of the glass vessel could be recognized as complicated colors such as rainbow colors, iridescent colors, and scale patterns.

Furthermore, with a coating film on the surface of a glass vessel or without such a coating film, extremely complicated colors such as rainbow colors could be recognized as a mixture of the color of contents and the color of the glass vessel. Therefore, in various kinds of applications, the decorativeness or aesthetic appearance could be further improved.

Furthermore, a multilayer film composed of multiple vapor deposition layers having different refractive indices are constructed from a plurality of inorganic materials or the like as raw materials, so that a significantly high value of surface hardness could be obtained in contrast to a resin coating film. Therefore, without providing an over-coating layer, the protective properties and anti-scratching properties of the glass vessel could be also improved.

Furthermore, an under layer of the multilayer film may contain a silica layer or the like to improve the adhesion between a three-dimensional glass vessel and a multilayer film, so that the peeling between the glass vessel and the multilayer film could be easily prevented.

In addition, according to the process of producing the multicolor development glass vessel of the invention, a multilayer film, which is composed of multiple vapor deposition layers having different refractive indices, is formed by vapor deposition or sputtering technique. Consequently, depending on the direction of viewing the glass vessel, a multicolor development glass vessel having a significantly improved surface hardness could be provided efficiently and stably.

PREFERRED MODE FOR CARRYING OUT THE INVENTION

First Embodiment

As shown in FIGS. 1 to 5, a first embodiment is a multicolor development glass vessel 8 where a multilayer film 6 composed of multiple vapor deposition layers 6a-6h having different refractive indices are directly or indirectly provided on an external surface and internal surface, or either one thereof, of a glass vessel 2.

Hereinafter, it will be concretely described with respect to divided constituent elements or the like.

1. Glass Vessel (1) Configuration

The configuration of the glass vessel may be, but not specifically limited to, those corresponding to the applications of glass vessels such as cosmetic bottles and medical bottles, such as bottleneck-type glass bottles, square-shaped glass bottles, cylindrical glass bottles, irregular-shaped glass bottles, square-shaped glass boxes, cylindrical glass boxes, and irregular-shaped glass boxes.

Furthermore, with respect to the configuration of the glass vessel, it is preferable that a thickened area may be provided along a periphery portion or a chamfered area may be formed on a part of the periphery portion.

This is because interference rays concentrate on the thickened area or chamfered area of the periphery portion to permit an observation of more vivid and complicated colors when the glass vessel is viewed from its front.

Furthermore, the types of glass that constructs the glass vessel include, but not specifically limited to, soda-lime glass, borosilicate glass, lead glass, phosphatic glass, and aluminosilicate glass.

(2) Staining Properties

In addition, hyaline glass could be preferably used as a glass material that constitutes a glass vessel. Alternatively, colored transparent glass or colored semitransparent glass may be preferably used. This is because the use of colored transparent or colored semitransparent glass enables to recognize complicated colors such as rainbow colors, iridescent colors, and scale patterns by interference rays without lowering the identity of the content. For instance, when the content to be housed in the glass vessel is white, such color could be recognized without hindrance, as well as complicated colors such as rainbow colors could be clearly recognized by interference rays.

(3) Hardened Coating Film

Figure 3:
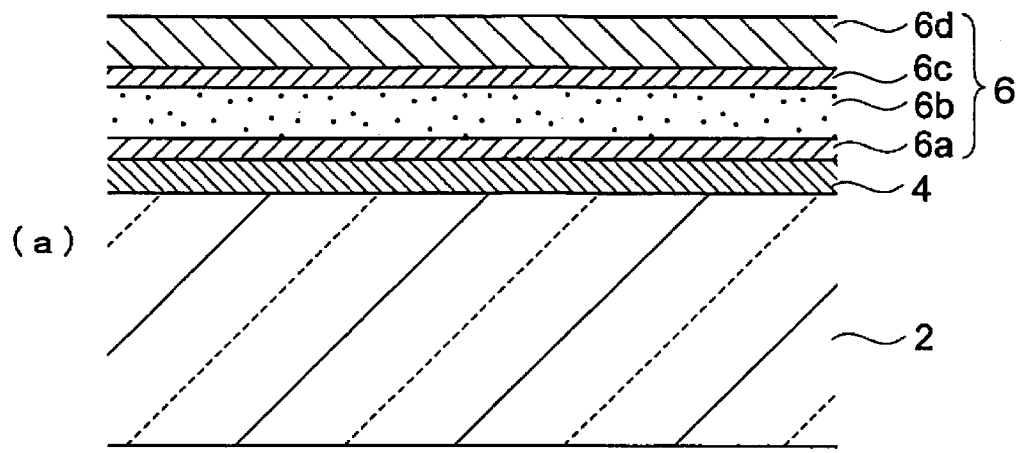
FIGS. 3(a)-(b) are partially cross-sectional diagrams for illustrating an embodiment of the multicolor development glass vessel provided with a hardened coating film.
Figure 3:
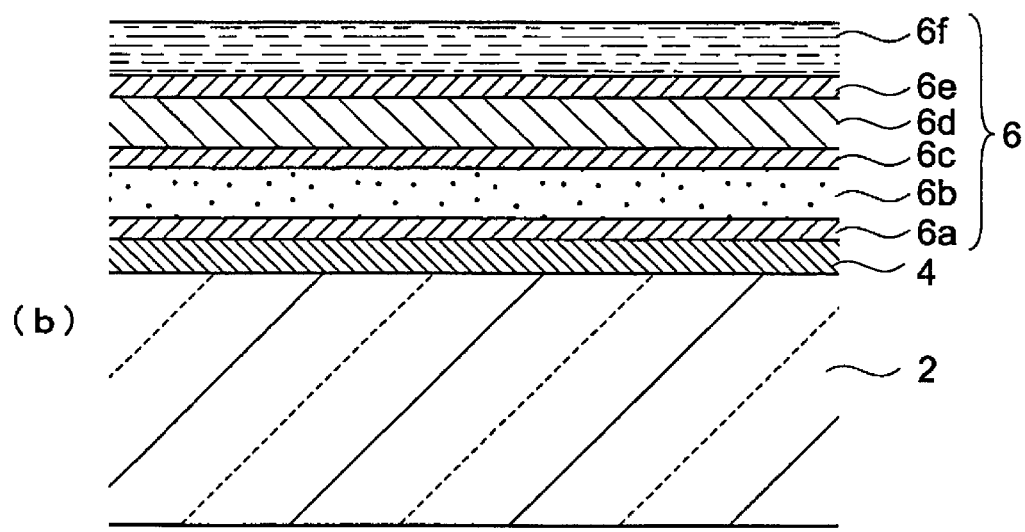
Figure 4:
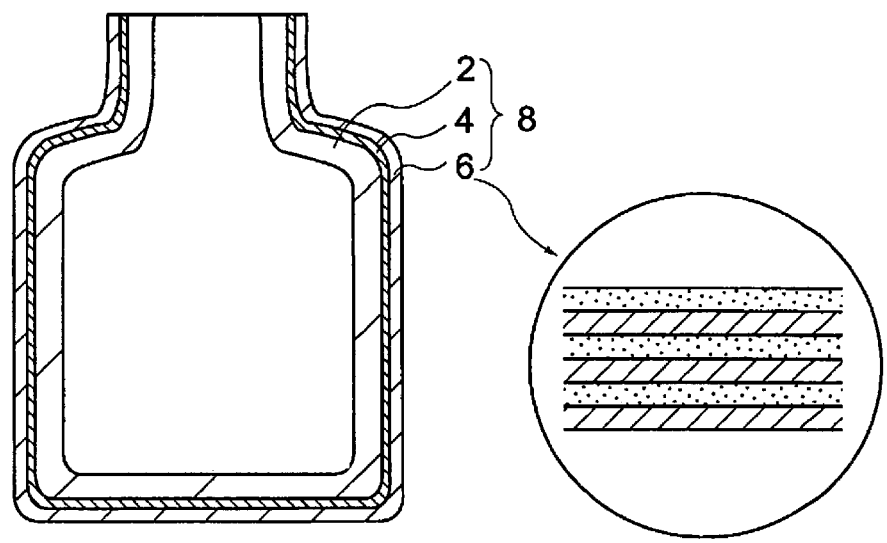
FIGS. 4(a)-(b) are cross-sectional diagrams for illustrating an embodiment of the multicolor development glass vessel.
Figure 4:
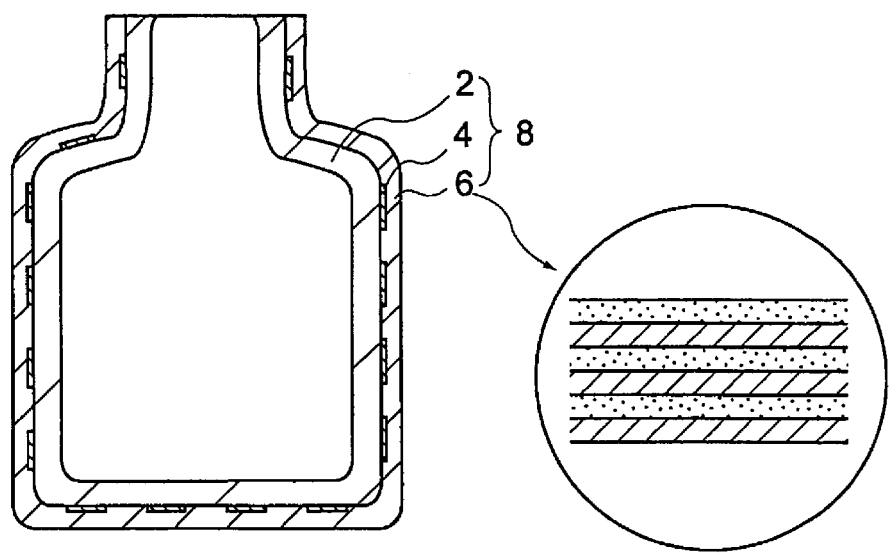
Figure 5:
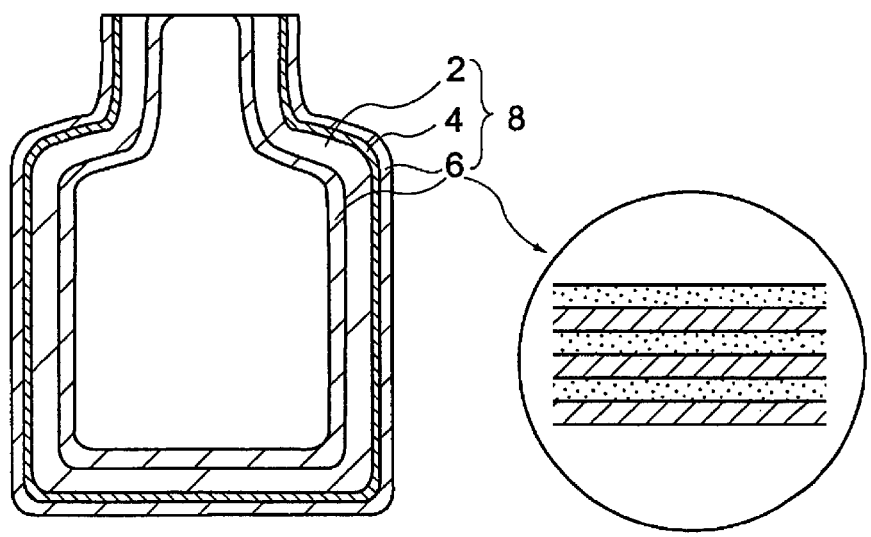
FIGS. 5(a)-(b) are partially cross-sectional diagrams for illustrating an embodiment of the multicolor development glass vessel provided with a hardened coating film.
Figure 5:
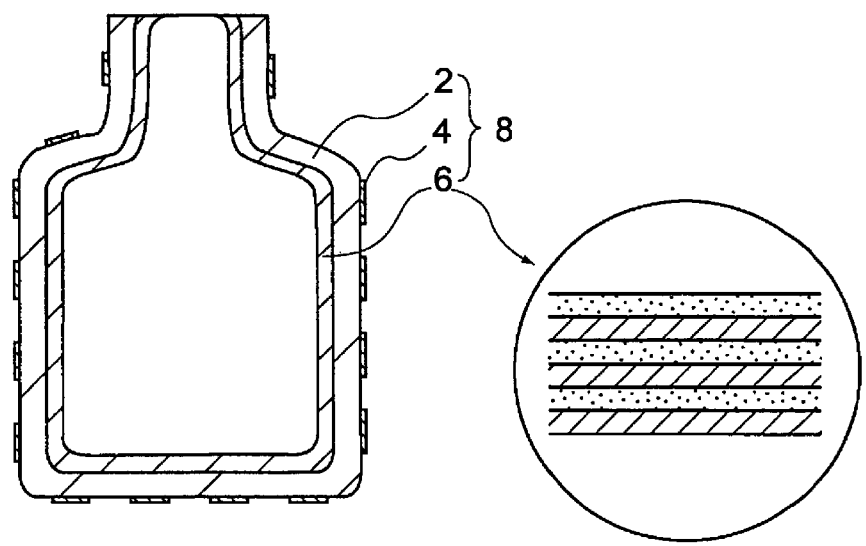

In addition, as shown in FIGS. 3 to 5, it is preferable to provide a hardened coating film 4 wholly or partially on the surface of a glass vessel 2. More concretely, it is preferable to prepare a hardened coating film as a principal agent, where the hardened coating film comprises polysiloxane-based resin, melamine resin, phenol resin, urea resin, guanamine resin, and derivatives thereof.

In particular, the hardness of a hardened coating film could be easily adjusted to any value in a desired range as described later by providing with a polysiloxane-based hardened coating film, thereby the peeling between the glass vessel and the multilayer film could be effectively prevented.

In addition, as a component of the hardened coating film, it is preferable to use a polyol-denatured formaldehyde-based resin constructed by allowing a melamine resin or the like to react with a polyol compound such as a hydroxyl group-containing acrylic resin, a hydroxyl group-containing epoxy resin, a hydroxyl group-containing polyester resin, a hydroxyl group-containing urethane resin, or the like.

This is because the use of such a polyol-denatured formaldehyde-based resin permits an improvement in adhesion to glass while allowing a more improvement in smoothness and thin-film properties of the hardened coating film.

In addition, it is preferable to add a hardening agent (including a hardening catalyst, the same shall apply hereinafter) to a principle ingredient of a polysiloxane-based resin or melamine resin.

Such hardening agents include platinum, dibutyltin, oxalic acid dimethylester, oxalic acid diethyl ester, maleic anhydride, phthalic anhydride, sodium monochloroacetate, potassium monochloroacetate, α,α-dichlorohydrin, ethamine hydrochloride, triethanolamine hydrochloride, ammonium chloride, ammonium sulfate, ammonium chloride salt, ammonium sulfate salt, urea derivatives, and imide diammonium sulfate, which may be used independently or in combination of two or more of them.

Furthermore, the amount of the hardening agent added is preferably in the range of 0.1 to 30 parts by weight with respect to 100 parts by weight of the principle ingredient.

This is because no addition effect may be expressed when the amount of the hardening agent added is less than 0.1 parts by weight. On the other hand, when the amount of the hardening agent added exceeds 30 parts by weight, the reactivity of the principle ingredient may be hardly controlled.

In addition, it is preferable to add various additives to a thermosetting composition that constitutes a hardened coating film. Particularly, it is preferable to add a silane-coupling agent in an amount of 0.5 to 20 parts by weight with respect to 100 parts by weight of the principle ingredient.

The types of such a silane-coupling agent used preferably include, but not specifically limited to, aminosilane-coupling agents such as Y-ureide propyl triethoxysilane, Y-ureide propyl trimethoxysilane, Y-aminopropyl triethoxysilane, Y-aminopropyl trimethoxysilane, Y-(2-aminoethyl) aminopropyl trimethoxysilane, and Y-(2-aminoethyl) aminopropyl methyl dimethoxysilane.

Furthermore, it is preferable that the hardened coating film has a thickness of 1 to 100 μm.

This is because the hardened coating film may have poor strength when the thickness thereof is less than 1 μm and thus it may tend to be peeled off from the surface of a glass vessel or may become difficult to be formed uniformly. On the other hand, when the thickness of the hardened coating film exceeds 100 μm or more, a multilayer film formed thereon may tend to be peeled off.

Therefore, the hardened coating film may be more preferably in the range of 5 to 50 μm, still more preferably in the range of 10 to 30 μm.

In addition, it is preferable that the pencil hardness of the hardened coating film is 3 to 5 H in accordance with JIS K-5400.

This is because, if the pencil hardness of the hardened coating film is less than 3H and a multilayer film is formed thereon, the whole hardened coating film may tend to be peeled off due to the internal stress of the multilayer film. On the other hand, if the pencil hardness of the hardened coating film exceeds 5H, the hardened coating film itself may tend to be peeled off at the corner or the like of the glass vessel.

Therefore, it is preferable to set the pensile strength of the hardened coating film to be within a range of 4 to 5H.

2. Multilayer Film

In the present invention, as shown in FIGS. 1 to 5, a characteristic feature is to provide a multilayer film 6 composed of multiple vapor deposition layers 6a to 6h having different refractive indices on the external and internal surfaces of a glass vessel 2.

This is because, by providing the multilayer film composed of multiple vapor deposition layers having different refractive indices, interference rays having different wavelengths tend to occur to allow the recognition of different colors depending on the direction of viewing a glass vessel. Therefore, when the surface of a glass vessel has a coating film, or even in the case of having no coating film, the color of the glass vessel could be recognized as extremely complicated colors and the decorativeness and aesthetic appearance of the glass vessel could be improved in various applications when the colored content is housed in the inside of the glass vessel.

In addition, by providing the multilayer film composed of multiple vapor deposition layers having different refractive indices, the surface hardness could be significantly increased in contrast to a resin-coating film. Therefore, without making an overcoat layer, it is possible to improve the protective properties and anti-scratching properties.

Furthermore, the components of multiple vapor deposition layers having different refractive indices include silica ($SiO_2$, refractive index: 1.46), germanium (Ge, refractive index: 4.0), zinc sulfide (ZnS, refractive index: 2.4), titanium dioxide ($TiO_2$, refractive index: 2.4), cerium oxide ($CeO_2$, refractive index: 2.3), tantalum oxide ($Ta_2O_5$, refractive index: 2.1), oxidation zirconium ($ZrO_2$, refractive index: 2.05), silicon monoxide (SiO, refractive index: 1.9), yttrium oxide ($Y_2O_3$, refractive index: 1.87), lead fluoride ($PbF_2$, refractive index: 1.75), magnesium oxide (MgO, refractive index: 1.72), oxidation aluminum ($Al_2O_3$, refractive index: 1.63), cerium fluoride ($CeF_3$, refractive index: 1.3), lanthanum fluoride ($LaF_3$, refractive index: 1.55), a silicon dioxide ($SiO_2$, refractive index: 1.46), barium fluoride ($BaF_2$, refractive index: 1.3), calcium fluoride ($CaF_2$, refractive index: 1.4), magnesium fluoride ($MgF_2$, refractive index: 1.38), lithium fluoride (LiF, refractive index: 1.36), and sodium fluoride (NaF, refractive index: 1.3), which may be used independently or in combination of two or more of them.

Figure 1:
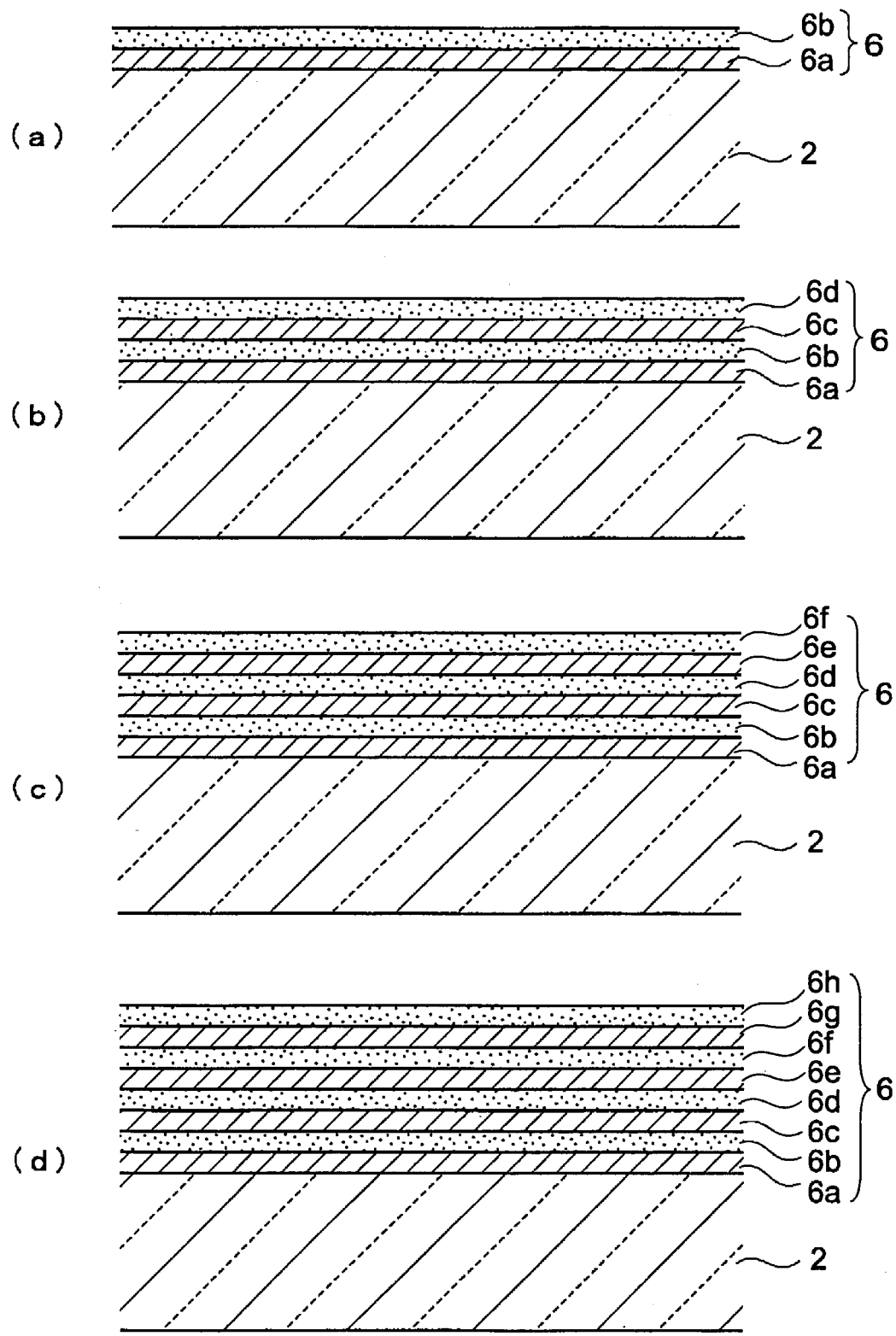
FIGS. 1(a)-(d) are partially cross-sectional diagrams for illustrating an embodiment of the multicolor development glass vessel.

Furthermore, as shown in FIG. 1 (a) to (d), it is preferable that the multilayer film 6 contains two types of vapor deposition layers 6a-6h having a reflective index of 0.1 or more in an alternative way.

This is because, by configuring in such a way, depending on the direction of viewing a glass vessel, interference rays having different wavelengths could further tend to occur to allow the recognition of various colors on the glass vessel.

Furthermore, by configuring in such a way, the number of vapor deposition materials and variations in vapor deposition conditions could be reduced to easily and stably carry out the formation of a multilayer film. Besides, by configuring in such a way, the inner stress of the multilayer film could be easily reduced.

Furthermore, as a lower layer of the multilayer film, at least one of a silica layer, a chromium layer, a zirconium layer, and an aluminum layer is included.

This is because, by configuring in such a way, the adhesion between the glass vessel and the multilayer film could be improved and the peeling between the glass vessel and the multilayer film could be easily prevented.

Furthermore, as a lower layer of the multilayer film, the thickness of the silica, chromium, or zirconium layer is not always enough to generate interference rays, and thus, for example, it is preferably in the range of 10 to 100 nm.

Furthermore, in addition to constitute a multilayer film from two types of vapor deposition layers, it is preferable to include a silica layer and a titanium layer in the vapor deposition layers.

This is because, by configuring in such a way, the adhesion to a glass vessel could be enhanced while effectively preventing the multilayer film from peeling off. In addition, a silica layer having a comparatively small refractive index and a titanium layer having a comparatively large refractive index are included, so that multiple colors could be extensively exerted. In this manner, furthermore, by constructing from a specific vapor deposition layer, variations in vapor deposition conditions could be reduced and the formation of a multilayer film could be easily and stably carried out.

Preferably, furthermore, the multiple vapor deposition layers would have their respective thicknesses in the range of 50 to 3,000 nm.

This is because, when the thickness of each vapor deposition layer is less than 50 nm, it may be difficult to generate interference rays efficiently and stably. In contrast, when the thickness of each vapor deposition layer exceeds 3,000 nm, it may be difficult to form a uniform thickness or may be difficult to generate interference rays stably. Furthermore, by configuring in such a way, distortions caused in multiple vapor deposition layers could be diminished and variations in vapor deposition conditions could be also reduced, so that the formation of a multilayer film could be carried out easily and stably.

Therefore, the multiple vapor deposition layers have their respective thicknesses more preferably in the range of 80 to 1,000 nm, further preferably in the range of 100 to 800 nm.

Furthermore, as shown in FIG. 1 (a) to (d), it is preferable that the multiple vapor deposition layers 6a to 6h have substantially the same thickness, respectively.

This is because, by configuring in such a way, interference rays having different wavelengths may tend to occur much more to allow the recognition of various colors on a glass vessel. In addition, distortions caused in multiple vapor deposition layers could be diminished, while the adhesion to a glass vessel could be enhanced. Furthermore, by configuring in such a way, variations in vapor deposition conditions could be also reduced, so that the formation of a multilayer film could be carried out easily and stably.

Figure 2:
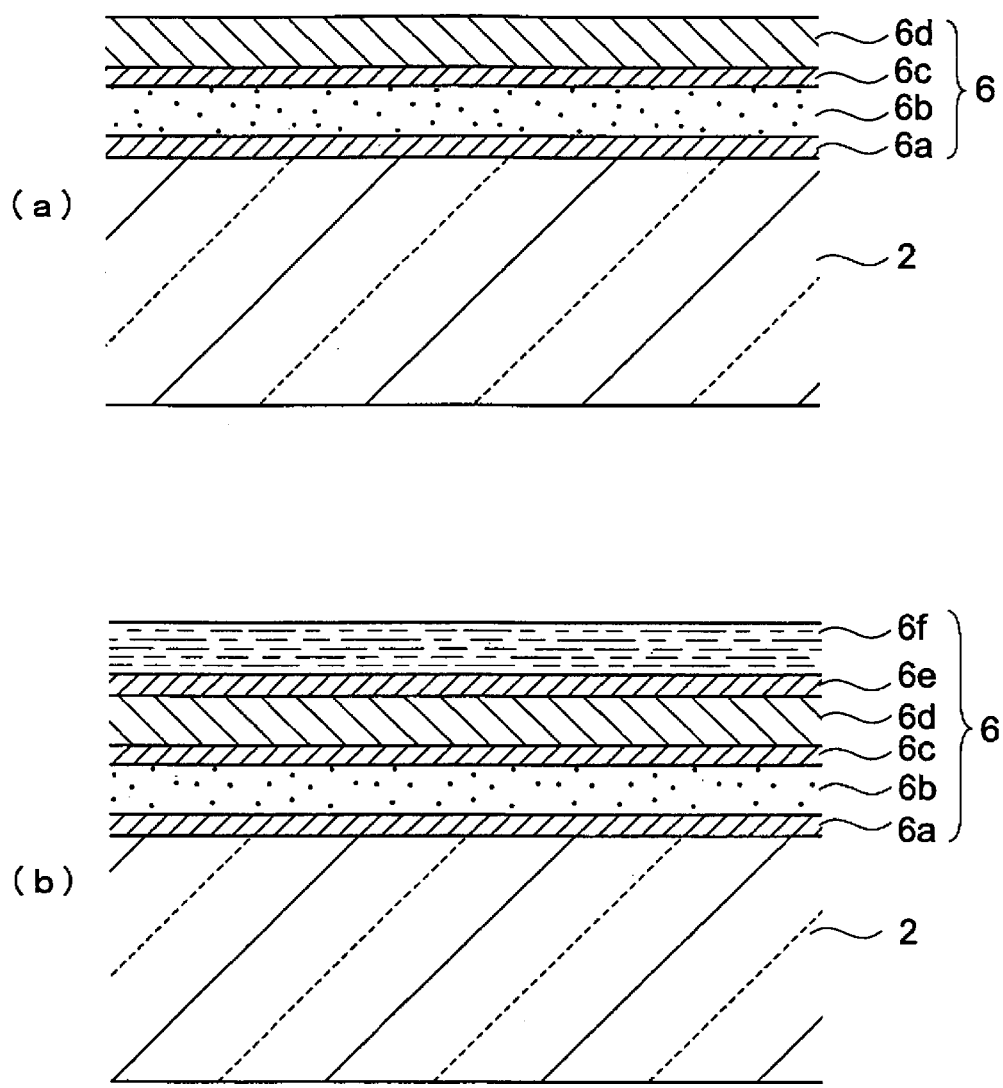
FIGS. 2(a)-(b) are partially cross-sectional diagrams for illustrating another embodiment of the multicolor development glass vessel.

However, as shown in FIGS. 2 and 3, even if the thicknesses of multiple vapor deposition layers that constitute a multilayer film are changed, their refractive indices and thicknesses could be suitably adjusted to enhance the adhesion of the multilayer film to a glass vessel while allowing the recognition of various colors on the glass vessel.

Second Embodiment

Figure 6:
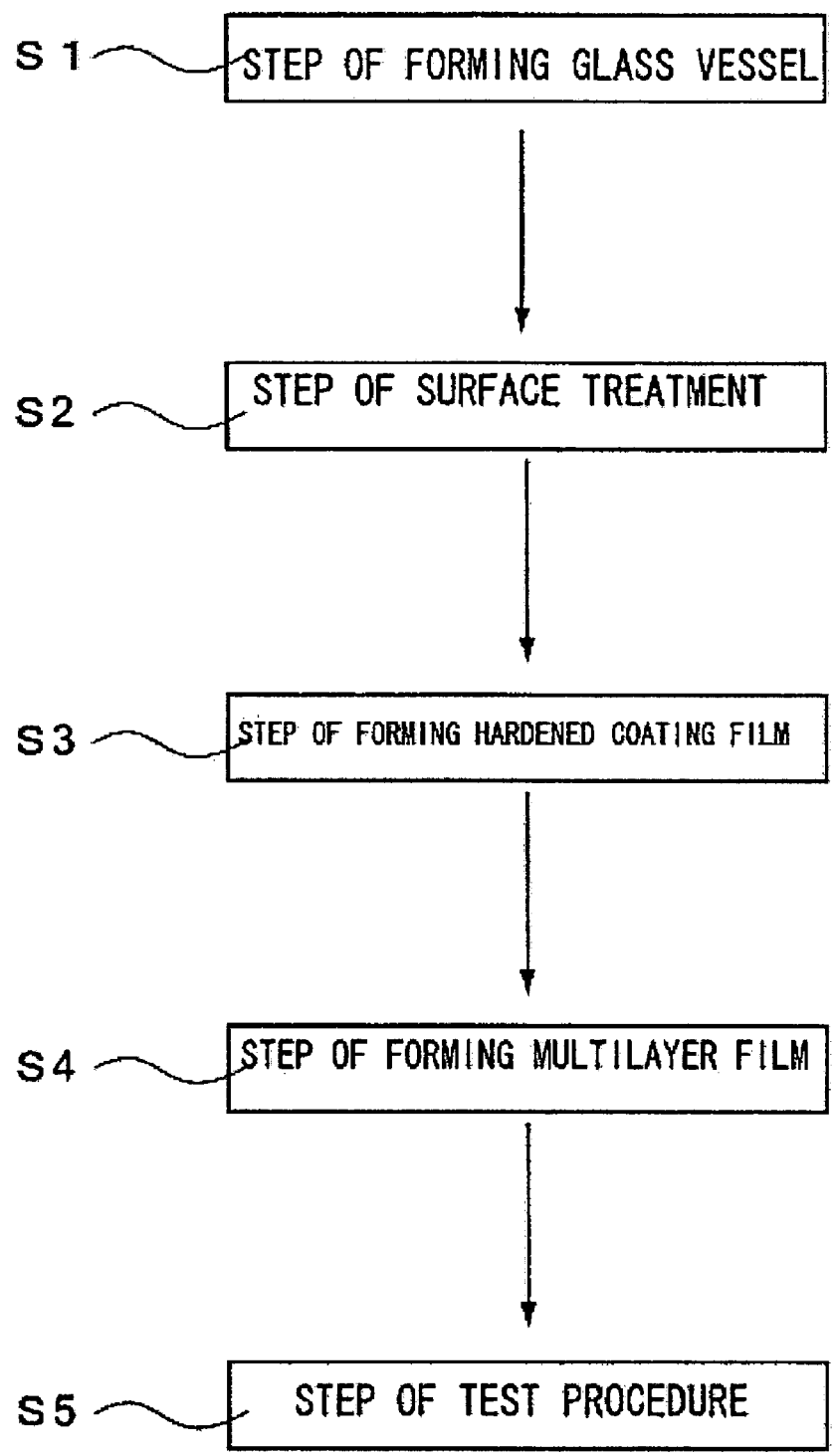
FIG. 6 is a flowchart for illustrating the process of producing a multicolor development glass vessel provided with a hardened coating film.

A second embodiment is a process of producing a multicolor development glass vessel directly or indirectly having a multilayer film on the surface of a glass vessel and the characteristic feature of the process is to include the following steps (1) and (2) as shown in the general process in FIG. 6.

(1) preparing the glass vessel;

(2) forming a multilayer film composed of multiple vapor deposition layers whose refractive indices differ from each other, directly or indirectly provided on an external surface and an internal surface, or either one thereof of the glass vessel, by a vapor deposition or sputtering technique.

Hereinafter, the process will be described in detail with respect to individual steps.

1. Preparation Step for Glass Vessel (1) Coating Step

As shown in FIG. 6, after preparing a glass vessel in S1, preferably, a coating step is provided as shown in S3 via a surface treatment step as shown in S2 to apply a thermosetting composition or an ultraviolet-curing composition, followed by curing the composition to form a hardened coating film on the surface of the glass vessel.

Here, examples of the process of coating the thermosetting composition or the like include, but not specifically limited to, an electrostatic coating method, an electrodeposition-coating method, a roll-coater method, an air-spraying method, an airless-spraying method, and a curtain-flow-coater method.

Furthermore, among these coating methods, the electrostatic or air-spraying method is more preferably used in that it is possible to make a thinner film and the curved surface of glass could be uniformly coated, while the structure of a coating device is simple.

(2) Hardening Step

Sintering conditions in the hardening step could be suitably modified depending on the reactivity of a thermosetting composition used. In general, it is preferably carried out under the conditions of 140 to 250° C. for 1 to 120 minutes, more preferably under the conditions of 150 to 230° C. for 5 to 60 minutes, still more preferably under the conditions of 160 to 220° C. for 10 to 30 minutes.

Furthermore, when the thermosetting composition is a paint to be dried at normal temperature, it is preferable to dry at room temperature for one to seven days, more preferably two to four days.

On the other hand, in the coating step, when the ultraviolet-curing composition is used, the amount of UV exposure is, for example, in the range of 50 to 1,000 mJ/cm$^2$ in order to make a hardened coating film.

(3) Step of Surface Treatment

Furthermore, for enhancing the adhesion of a glass vessel to a hardened coating film composed of a hardening composition, as shown in S2 in FIG. 6, a primer step for the formation of a primer step and a flame step for carrying out a flame treatment (treatment with flame and treatment with silicate flame) on the surface of the glass vessel are preferably provided before the coating step.

A primer that constitutes such a primer layer is preferably at least one selected from the group consisting of an epoxy resin primer, a polyurethane-denatured epoxy resin primer, and a polyester resin primer.

Furthermore, it is also preferable to coat any of primers containing polyol compounds as described above, such as a polyol compound/organic solvent, a polyol compound/silane-coupling agent/organic solvent, and a polyol compound/formaldehyde resin/silane-coupling agent/organic solvent as a primer.

On the other hand, when a flame treatment is conducted on the surface of a glass vessel, silicate flame or the like is used for form a thin film of silicon dioxide (silica) on the surface of glass to improve the wettability of the surface or removing organic materials attached on the surface of glass, thereby increasing the adhesion of the hardened coating film to the glass.

More specifically, for example, silicate flame (flame temperature: 800 to 1,500° C.) using a silica compound or propane gas as combustion gas is preferably blown to heat the surface of glass under the conditions of 0.5 to 30 seconds.

Furthermore, for carrying out the flame treatment (treatment with flames), the surface of glass is heated at a temperature preferably in the range of 50 to 200° C., more preferably in the range of 60 to 180° C., still further preferably in the range of 70 to 150° C.

2. Step of Forming Multilayer Film

Subsequently, as shown in S4 of FIG. 6, for carrying out the step of forming a multilayer film, for instance, a vacuum deposition or spattering technique is preferably used.

That is, the vacuum deposition or spattering technique is applied. In addition, as a heating procedure, it is preferable to include at least one of an electric gun (EB gun), as well as resistance heating, high-frequency induction heating, laser-beam heating, or the like.

Furthermore, as described above, a multilayer film may be formed using $TiO_2$, $SiO_2$, $Ta_2O_5$, $Al_2O_3$, $ZrO_2$, $MgF_2$, or the like. In addition, it is preferable to add a bias or the like to a substrate or modify the vapor deposition conditions such that the substrate temperature may be raised or cooled, or the like.

Furthermore, when a plurality of vapor deposition sources is heated using the same electronic gun, it is preferable to heat each deposition source by scanning an electron beam in a time-divided manner.

Furthermore, for a method of controlling the composition or thickness of a vapor deposition film, when heating with the same electron gun, it is preferable to control a time period for scanning each deposition source. On the other hand, for heating with two or more electron guns, it is also preferable to apply a method of controlling input powers to correspond with the respective deposition sources.

Figure 7:
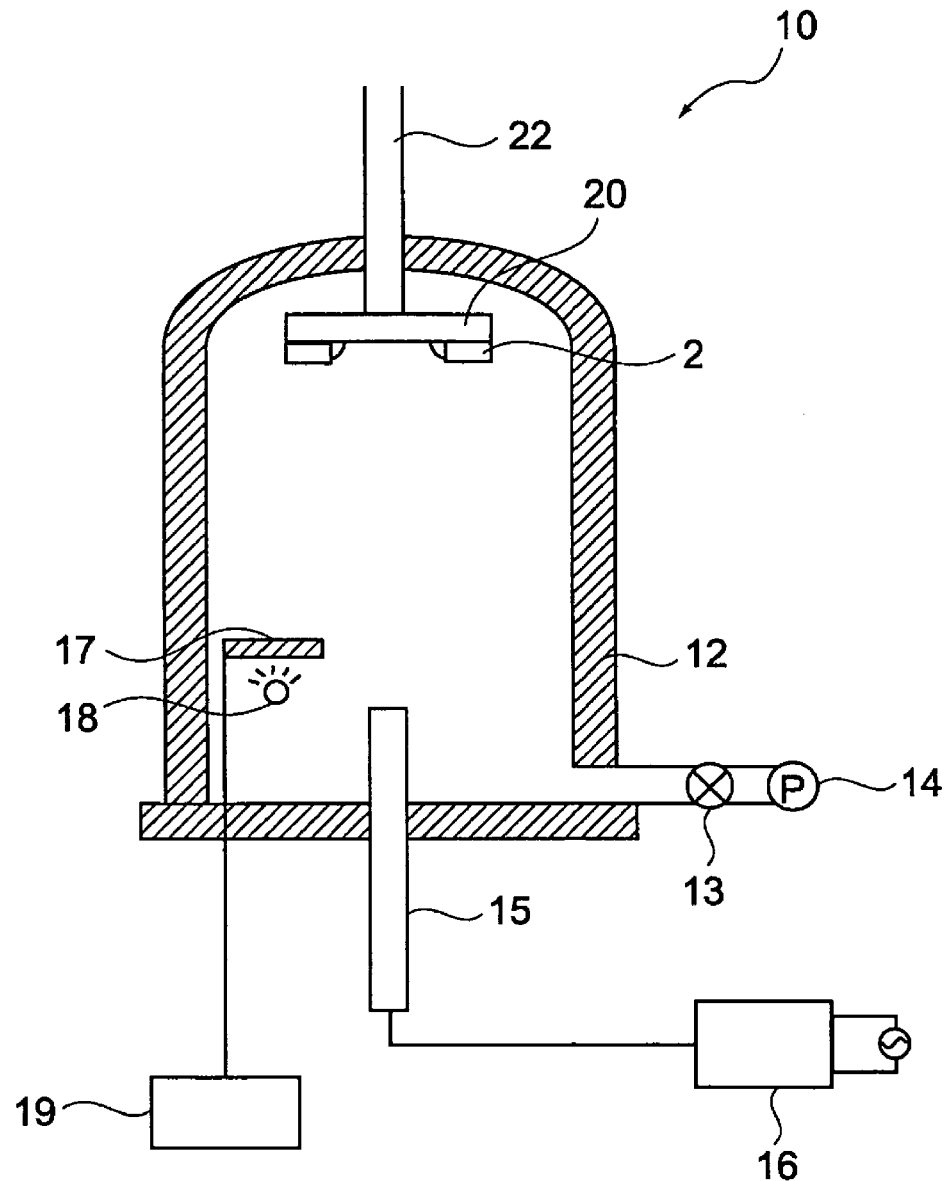
FIG. 7 is a diagram for illustrating a vacuum evaporator.

Here, in FIG. 7, there is shown an example of a vacuum evaporator 10. Preferably, the vacuum evaporator 10 comprises at least a vacuum vessel 12, a vacuum pump 14, a heater part (electron gun) 15, a glass vessel holder part 20. In addition, it is preferable to provide a drive-controller part 16 and a shutter 17 of the heater part 15 for controlling the evaporation state of a vapor-deposited product from a vapor-deposition source 18. Therefore, through the drive-controller part 16, electron beams are radiated on multiple vapor-deposition sources 18 from the heater part 15 and the shutter 17 is then opened or closed to form a multilayer film composed of multiple vapor deposition layers having different refractive indices on a glass vessel 2 retained on the glass vessel holder part 20.

Then, on the surface of the glass vessel 2, for forming a multilayer film composed of multiple vapor deposition layer having different refractive indices could be formed on the surface of the glass vessel 2 uniformly and stably, it is preferable to provide a revolving member 22 for revolving the glass vessel holder part 20 in the inside of the vacuum vessel 12.

In other words, for example, the glass vessel is revolved in the horizontal direction and the axial direction at a rate of 10 to 100 rpm, respectively to form a multilayer film, thereby forming the multilayer film on the surface of a glass vessel uniformly and stably.

EXAMPLES

Hereinafter, the content of the present invention will be described in more detail with reference to examples below. However, the technical scope of the present invention could be, but not limited to the descriptions of only these examples, suitably modified as far as within the scope of the object of the present invention.

Example 1

1. Formation of Hardened Coating Film

Thermal-hardening compositions (A to E) described below were air-sprayed on bottle-necked glass bottles (10 cm in height, 4 cm in diameter, 3 cm in height of bottle-necked portion, and 2 cm in diameter of bottle-necked portion) and then sintered under the conditions of 180° C. for 20 minutes, thereby forming white hardened coating films of 30 μm in thickness with a pencil hardness of 4H in accordance with JIS K 5600,

| | | |
|---|---|---|
| A: Curable siloxane compound | 100 | parts by weight |
| B: Silane-coupling compound | 5 | parts by weight |
| C: Hardening catalyst | 5 | parts by weight |
| D: Titanium oxide | 1 | part by weight |
| E: Xylene | 50 | parts by weight |

2. Formation of Multilayer Film

Subsequently, using a vacuum evaporator shown in FIG. 7, a glass bottle is revolved at 30 rpm in the horizontal direction, while a silica layer ($SiO_2$) of 100 nm in thickness, a titanium layer (Ti) of 100 nm in thickness, a silica layer of 100 nm in thickness, a titanium layer of 100 nm in thickness, a silica layer of 100 nm in thickness, and a titanium layer of 100 nm in thickness were alternately formed on a white hardened coating film. That is, a multilayer film composed of six-vapor deposition layers having different refractive indices, thereby providing a multicolor development glass vessel.

3. Evaluation on Multicolor Development Glass Vessel

The following evaluations on coloring, adhesion, and pencil strength with respect to the resulting multicolor development glass vessel were carried out. The respective results thus obtained are shown in Table 1.

(1) Coloring

The resulting multicolor development glass vessel was set up in the vertical direction and then viewed at varying angles within the range of 0 to 180° with respect to the horizontal direction.

+++: Clear rainbow colors and iridescent colors can be viewed.

++: Slightly clear rainbow colors and iridescent colors can be viewed.

+: Poor rainbow colors and iridescent colors can be viewed.

−: Only single color can be viewed.

(2) Adhesion

A cross-cut tape method in accordance with JIS K 5600 was carried out with respect to the resulting multicolor development glass vessel. From the number of peeled cross-cuts per 100 cross-cuts, the adhesion was evaluated with reference to the following criteria:

+++: The number of peeled cross-cuts is 0/100 or less.

++: The number of peeled cross-cuts is 3/100 or less.

+: The number of peeled cross-cuts is 10/100 or less.

−: The number of peeled cross-cuts is 10/100 or more.

(3) Pencil Hardness

For the resulting multicolor development glass vessel, pencil hardness was measured in accordance with JIS K 5600.

Examples 2 to 5

In Examples 2 to 5, multicolor development glass vessels were prepared and evaluated by the same way as that of Example 1, except of the follows: In a glass bottle, a silica layer ($SiO_2$) of 100 nm in thickness and a titanium layer (Ti) of 100 nm in thickness were alternately formed on a white hardened coating film. Then, multilayer films composed of two, three, four, and five vapor deposition layers having different refractive indices were formed, respectively.

Comparative Examples 1 to 2

In Comparative Examples 1 to 2, multicolor development glass vessels were prepared and then the coloring and so on were evaluated by the same way as that of Example 1, except of the follows: In a glass bottle, a silica layer ($SiO_2$) of 100 nm in thickness or a titanium layer (Ti) of 100 nm in thickness was formed on a white hardened coating film.

TABLE 1

| | Hardened coating film | Multilayer film | Coloring | Adhesion | Pencil strength |
|---|---|---|---|---|---|
| Example 1 | White coating film | $SiO_2$/Ti 6 layers | +++ | +++ | 5H |
| Example 2 | White coating film | $SiO_2$/Ti 2 layers | + | ++ | 2H |
| Example 3 | White coating film | $SiO_2$/Ti 3 layers | ++ | ++ | 3H |
| Example 4 | White coating film | $SiO_2$/Ti 4 layers | ++ | +++ | 4H |
| Example 5 | White coating film | $SiO_2$/Ti 5 layers | ++ | +++ | 5H |
| Comparative Example 1 | White coating film | $SiO_2$ monolayer | − | − | H |
| Comparative Example 2 | White coating film | Ti monolayer | − | − | H |

Examples 6 to 10 and Comparative Examples 3 to 4

In each of Examples 1 to 5 and Comparative Examples 1 to 2, multicolor development glass vessels were prepared and evaluated by the same way as that of Example 1, except of the follows: a white hardened coating film was not formed on the surface of a bottle-necked type glass bottle, while a white emulsion was filled in the inside of the glass bottle. The respective results are shown in Table 2.

TABLE 2

|  | Hardened coating film | Multilayer film | Coloring | Adhesion | Pencil strength |
|---|---|---|---|---|---|
| Example 6 | Absence | $SiO_2$/Ti 6 layers | +++ | ++ | 5H |
| Example 7 | Absence | $SiO_2$/Ti 2 layers | + | + | 2H |
| Example 8 | Absence | $SiO_2$/Ti 3 layers | ++ | + | 2H |
| Example 9 | Absence | $SiO_2$/Ti 4 layers | ++ | ++ | 3H |
| Example 10 | Absence | $SiO_2$/Ti 5 layers | ++ | ++ | 4H |
| Comparative Example 3 | Absence | $SiO_2$ mono-layer | − | − | H |
| Comparative Example 4 | Absence | Ti mono-layer | − | − | H |

INDUSTRIAL APPLICABILITY

According to the multicolor development glass vessel of the present invention, the color of such a glass vessel could be varied depending on the direction of viewing the glass vessel, while having an extensively high surface hardness, so that it could be appropriately used in the applications of glass vessels for aromatic substances, perfumes, cosmetics, and so on.

Furthermore, according to the process of producing the multicolor development glass vessel, the specified multilayer film could be formed stably and quickly by a vacuum deposition technique or the like, thereby providing a comparatively cheep glass vessel.

What is claimed is:

1. A multicolor glass bottle, comprising:
a base bottle,
a hardened coating film disposed on an external surface of the base bottle, and
a multilayer film disposed on the hardened coating film and composed of two vapor deposition layers having refractive indices differ from each other by 0.1 or more,
wherein the two vapor deposition layers comprises a first layer and a second layer which covers the first layer, the first and second layers being alternately laminated and each having a thickness between 50 and 800 nm,
wherein the first layer has a refractive index lower than a refractive index of the second layer, and contains at least one layer selected from the group consisting of a silica layer, a chromium layer, a zirconium layer, and an aluminum layer,
wherein the second layer contains a titanium layer,
wherein the hardened coating film comprises at least one material selected from the group consisting of polysiloxane-based resin, melamine resin, phenol resin, urea resin, guanamine resin, and derivatives thereof, and
wherein the hardened coating film has a thicknesses in a range of about 1 to 100 µm.

2. The multicolor glass bottle as described in claim 1, wherein the two vapor deposition layers comprise a silica layer and a titanium layer, and are arranged alternately more than two layers.

3. The multicolor glass bottle as described in claim 1, wherein the multiple vapor deposition layers have respective thicknesses in a range of 50 to 3,000 nm.

4. The multicolor glass bottle as described in claim 1, wherein the hardened layer has a hardness between 3H and 5H in pencil hardness in accordance with JIS K5400.

5. The multicolor glass bottle as described in claim 1, wherein the base container comprises a hyaline glass, colored transparent glass or colored semitransparent glass.

6. The multicolor glass bottle as described in claim 4, wherein the multilayer film comprises a plurality of a set of the first and second layers.

7. The multicolor glass bottle as described in claim 1, wherein said multilayer film generates interference rays having different wavelengths to provide different colors depending on a direction of viewing the glass container.

* * * * *